US008326446B2

(12) United States Patent
Oh et al.

(10) Patent No.: US 8,326,446 B2
(45) Date of Patent: Dec. 4, 2012

(54) METHOD AND AN APPARATUS FOR PROCESSING AN AUDIO SIGNAL

(75) Inventors: Hyen O Oh, Seoul (KR); Yang Won Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 902 days.

(21) Appl. No.: 12/424,990

(22) Filed: Apr. 16, 2009

(65) Prior Publication Data

US 2009/0265176 A1 Oct. 22, 2009

Related U.S. Application Data

(60) Provisional application No. 61/045,287, filed on Apr. 16, 2008, provisional application No. 61/048,561, filed on Apr. 29, 2008.

(30) Foreign Application Priority Data

Apr. 14, 2009 (KR) ........................ 10-2009-0032213

(51) Int. Cl.
*G06F 17/00* (2006.01)

(52) U.S. Cl. ........................................................ 700/94

(58) Field of Classification Search .................... 700/94; 381/119; 369/1-12; 704/500-504
See application file for complete search history.

(56) References Cited

U.S. PATENT DOCUMENTS 7,606,627 B2 * 10/2009 Wilson et al. .................... 700/94
7,738,982 B2 * 6/2010 Kobayashi et al. ............. 700/94
7,751,914 B2 * 7/2010 Hashimoto et al. ............. 700/94

(Continued)

FOREIGN PATENT DOCUMENTS

JP 8-65169 A 3/1996

(Continued)

OTHER PUBLICATIONS

Lee et al., "A Personalized Preset-Based Audio System for Interactive Service", AES Convention Paper 6904, [Online], pp. 1-6, Oct. 8, 2006, San Francisco, CA, USA, Retrieved from the Internet: URL: http://www.aes.org/tmpFiles/elib/20090611/13738.pdf, XP-002531682.

(Continued)

*Primary Examiner* — Andrew C Flanders
(74) *Attorney, Agent, or Firm* — Birch, Stewart, Kolasch & Birch, LLP

(57) ABSTRACT

An apparatus for processing an audio signal and method thereof are disclosed. The preset invention includes receiving a downmix signal including at least one object, object information based on attribute of the object, preset information to render the downmix signal and preset attribute information indicating attribute of the preset information; rendering the downmix signal by applying the preset information to all data regions of the downmix signal, if the preset information is included in an extension region of a configuration information region based on the preset attribute information; and rendering the downmix signal by applying the preset information to one corresponding data region of the downmix signal, if the preset information is included in an extension region of a data region based on the preset attribute information.

Accordingly, it is able to efficiently reconstruct an audio signal by individually selecting to apply the preset information by a data region unit or selecting to apply the same preset information to all data regions of a downmix signal according to a characteristic of a sound source.

4 Claims, 15 Drawing Sheets

U.S. PATENT DOCUMENTS

| | | | | |
|---|---|---|---|---|
| 2006/0106620 | A1* | 5/2006 | Thompson et al. | 704/500 |
| 2006/0122717 | A1 | 6/2006 | Wilson et al. | |
| 2006/0133618 | A1 | 6/2006 | Villemoes et al. | |
| 2007/0127733 | A1 | 6/2007 | Henn et al. | |
| 2008/0049943 | A1 | 2/2008 | Faller et al. | |
| 2008/0167880 | A1 | 7/2008 | Seo et al. | |
| 2010/0174548 | A1 | 7/2010 | Beack et al. | |

FOREIGN PATENT DOCUMENTS

| | | | |
|---|---|---|---|
| KR | 10-2006-0049941 | A | 5/2006 |
| KR | 10-2007-0051915 | A | 5/2007 |
| KR | 10-2007-0118161 | A | 12/2007 |
| KR | 10-0802179 | B1 | 2/2008 |
| KR | 10-2008-0029757 | A | 4/2008 |
| KR | 10-2008-0029940 | A | 4/2008 |
| WO | WO-2006/103584 | A1 | 10/2006 |
| WO | WO-2006/126843 | A2 | 11/2006 |
| WO | WO-2007/040354 | A1 | 4/2007 |
| WO | WO-2007/040366 | A1 | 4/2007 |
| WO | WO 2007/049881 | A1 | 5/2007 |
| WO | WO-2008/039038 | A1 | 4/2008 |
| WO | WO-2008/039042 | A1 | 4/2008 |

OTHER PUBLICATIONS

Herre et al., "New Concepts in Parametric Coding of Spatial Audio: From SAC to SAOC", Multimedia and Expo, 2007 IEEE International Conference On, IEEE, PI, pp. 1894-1897, Jul. 1, 2007, XP031124020.

Scheirer et al., "AudioBIFS: Describing Audio Scenes with the MPEG-4 Multimedia Standard", vol. 1, No. 3, pp. 237-250, IEEE Transactions on Multimedia, IEEE Service Center, Piscataway, NJ, US, Sep. 1, 1999, XP011036298.

* cited by examiner

FIG. 7

| Syntax | No.of bits | Mnemonic |
|---|---|---|
| SAOCSpecificConfig() | | |
| { | | |
| ⋮ | | |
| **bsNumPresets;** | 4 | uimsbf |
| numPresets = bsNumPresets; | | |
| If ( numPresets ) { | | |
| for ( i=0; i<numPresets; i++ ) { | | |
| **bsPresetLevel[i];** | 2 | uimsbf |
| **bsPresetDynamic[i];** | 1 | uimsbf |
| If (!bsPresetDynamic[i]) { | | |
| getPreset(); | | |
| } | | |
| } | | |
| **bsPresetMetaDataAvailable;** | 1 | uimsbf |
| if ( bsPresetMetaDataAvailable ) { | | |
| PresetMetaData ( numPresets ); | | |
| } | | |
| } | | |
| **bsReserved;** | 2 | uimsbf |
| ByteAlign(); | | |
| SAOCExtensionConfig(); | | |
| } | | |

FIG. 8

| Syntax | No.of bits | Mnemonic |
|---|---|---|
| SAOCFrame()<br>{<br>⋮<br>if ( numPresets ) {<br>for ( i=0; i<numPresets; i++) {<br>if ( bsPresetDynamic[i] ) {<br>getPreset();<br>}<br>}<br>}<br>ByteAlign();<br>SAOCExtensionFrame();<br>} | | |

FIG. 9

| Syntax | No.of bits | Mnemonic |
|---|---|---|
| getPreset()<br>{<br>firstPreset = 0;<br>[prst[i], prstQuantCoarse[i], prstFreqResStride[i]] =<br>EcData( t_CLD, prevPrstQuantCoarse[i],<br>prevPrstFreqResStride[i],<br>numParamSets, bsIndependencyFlag, firstPreset,<br>presetLevel(bsPresetLevel[i]) * numObjects );<br>} | | |

FIG. 10

| Syntax | No.of bits | Mnemonic |
|---|---|---|
| PresetMetaData(numPresets) | | |
| { | | |
| for (prst=0; prst<numPresets; prst++) { | | |
| **bsNumCharMetaData[prst];** | 8 | uimsbf |
| for (c=0; c<numCharMetaData[prst]; c++) { | | |
| **bsMetaData[prst][c];** | 8 | bslbf |
| } | | |
| } | | |
| } | | |

FIG. 11

| Syntax | No.of bits | Mnemonic |
|---|---|---|
| SAOCFrame() | | |
| { | | |
| ⋮ | | |
| firstPreset = 0; | | |
| if ( numPresets ) { | | |
| for ( i=0; i<numPresets; i++) { | | |
| for ( j=0; j<numObjects; j++) { | | |
| [prst[i][j], prstQuantCoarse[i][j], prstFreqResStride[i][j]] = | | |
| EcData( t_CLD, prevPrstQuantCoarse[i][j], | | |
| prevPrstFreqResStride[i][j], numParamSets, | | |
| bsIndependencyFlag, firstPreset, numRenderingChannel[i]); | | |
| } | | |
| } | | |
| } | | |
| ByteAlign(); | | |
| SAOCExtensionFrame(); | | |
| } | | |

METHOD AND AN APPARATUS FOR PROCESSING AN AUDIO SIGNAL

CROSS-REFERENCE TO RELATED APPLICATION

This Nonprovisional application claims priority under 35 U.S.C. 119(e) to U.S. Provisional Application Nos. 61/045,287 filed on Apr. 16, 2008, and 61/048,561 filed on Apr. 29, 2008, and under 35 U.S.C. 119(a) to Patent Application No. 10-2009-0032213 filed in the Republic of Korea on Apr. 14, 2009, respectively, all of which are hereby expressly incorporated by reference into the present application.

BACKGROUND OF THE INVENTION

1. Field of the Invention

The present invention relates to an apparatus for processing an audio signal and method thereof. More particularly, it is suitable for processing an audio signal received via a digital medium, a broadcast signal or the like.

2. Discussion of the Related Art

Generally, in a process for generating a downmix signal by downmixing an audio signal including at least one object into a mono or stereo signal, parameters are extracted from the objects. Theses parameters are used in decoding the downmixed signal. And, positions and gains of the objects can be controlled by a selection made by a user as well as the parameters.

Objects included in a downmix signal should be controlled by a user's selection. However, in case that a user controls an object, it is inconvenient for the user to directly control all object signals. And, it may be more difficult to reproduce an optimal state of an audio signal than a case that an expert controls objects.

SUMMARY OF THE INVENTION

Accordingly, the present invention is directed to an apparatus for processing an audio signal and method thereof that substantially obviate one or more of the problems due to limitations and disadvantages of the related art.

An object of the present invention is to provide an apparatus for processing an audio signal and method thereof, by which a level and position of an object can be controlled using preset information and preset metadata.

Another object of the present invention is to provide an apparatus for processing an audio signal and method thereof, by which an object included in a downmix signal can be controlled by applying preset information and preset metadata to all data regions of a downmix signal or one data region of a downmix signal according to a characteristic of a sound source.

Another object of the present invention is to provide an apparatus for processing an audio signal and method thereof, by which one of a plurality of preset metadata displayed on a display unit is selected based on a user's selection and by which a level and position of an object can be controlled using preset information corresponding to the selected metadata.

A further object of the present invention is to provide an apparatus for processing an audio signal and method thereof, by which select signal can be received from a user in a manner of displaying the object adjusted by applying the preset information thereto and the selected preset metadata on a display unit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing an audio signal according to the present invention includes receiving a downmix signal including at least one object, object information based on attribute of the object, preset information to render the downmix signal and preset attribute information indicating attribute of the preset information; rendering the downmix signal by applying the preset information to all data regions of the downmix signal, if the preset information is included in an extension region of a configuration information region based on the preset attribute information; and rendering the downmix signal by applying the preset information to one corresponding data region of the downmix signal, if the preset information is included in an extension region of a data region based on the preset attribute information. Preferably, the preset attribute information indicates whether the preset information is included in the extension region of the data region.

Preferably, the preset attribute information indicates that the preset information is dynamic or static.

Preferably, the dynamic indicates that the preset information is present in the extension region of the data region and the static indicates that the preset information is present in the extension region of the configuration information region. More preferably, a method of processing an audio signal according to the present invention further includes generating downmix processing information to control panning or gain of the downmix signal and multi-channel information to upmix the downmix signal by using the object information and the preset information; and modifying the downmix signal by using the downmix processing information.

To further achieve these and other advantages and in accordance with the purpose of the present invention, as embodied and broadly described, an apparatus of processing an audio signal according to the present invention includes a signal receiving unit receiving a downmix signal including at least one object and object information based on attribute of the object; a preset attribute information receiving unit receiving a preset attribute information indicating attribute of preset information to render of the downmix signal; a static preset mode receiving unit receiving preset mode corresponding to all data regions of the downmix signal, if the preset information is included in an extension region of a configuration information region based on the preset attribute information; a dynamic preset mode receiving unit receiving preset mode corresponding to single data region of the downmix signal, if the preset information is included in an extension region of a data region based on the preset attribute information; and a rendering unit rendering the downmix signal by applying the preset information to the all data regions or the single data region of the downmix signal, wherein the preset mode comprises the preset information and preset metadata corresponding to the preset information and the preset metadata indicates characteristics of the preset information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 7 to 11 are various syntaxs relevant to preset information in an audio signal processing method according to another embodiment of the present invention;

DETAILED DESCRIPTION OF THE INVENTION

Reference will now be made in detail to the preferred embodiments of the present invention, examples of which are illustrated in the accompanying drawings. First of all, terminologies in the present invention can be construed as the following references. And, terminologies not disclosed in this specification can be construed as the following meanings and concepts matching the technical idea of the present invention. Therefore, the configuration implemented in the embodiment and drawings of this disclosure is just one most preferred embodiment of the present invention and fails to represent all technical ideas of the present invention. Thus, it is understood that various modifications/variations and equivalents can exist to replace them at the timing point of filing this application.

In this disclosure, 'information' is the terminology that generally includes values, parameters, coefficients, elements and the like and its meaning can be construed as different occasionally, by which the present invention is non-limited.

Figure 1:
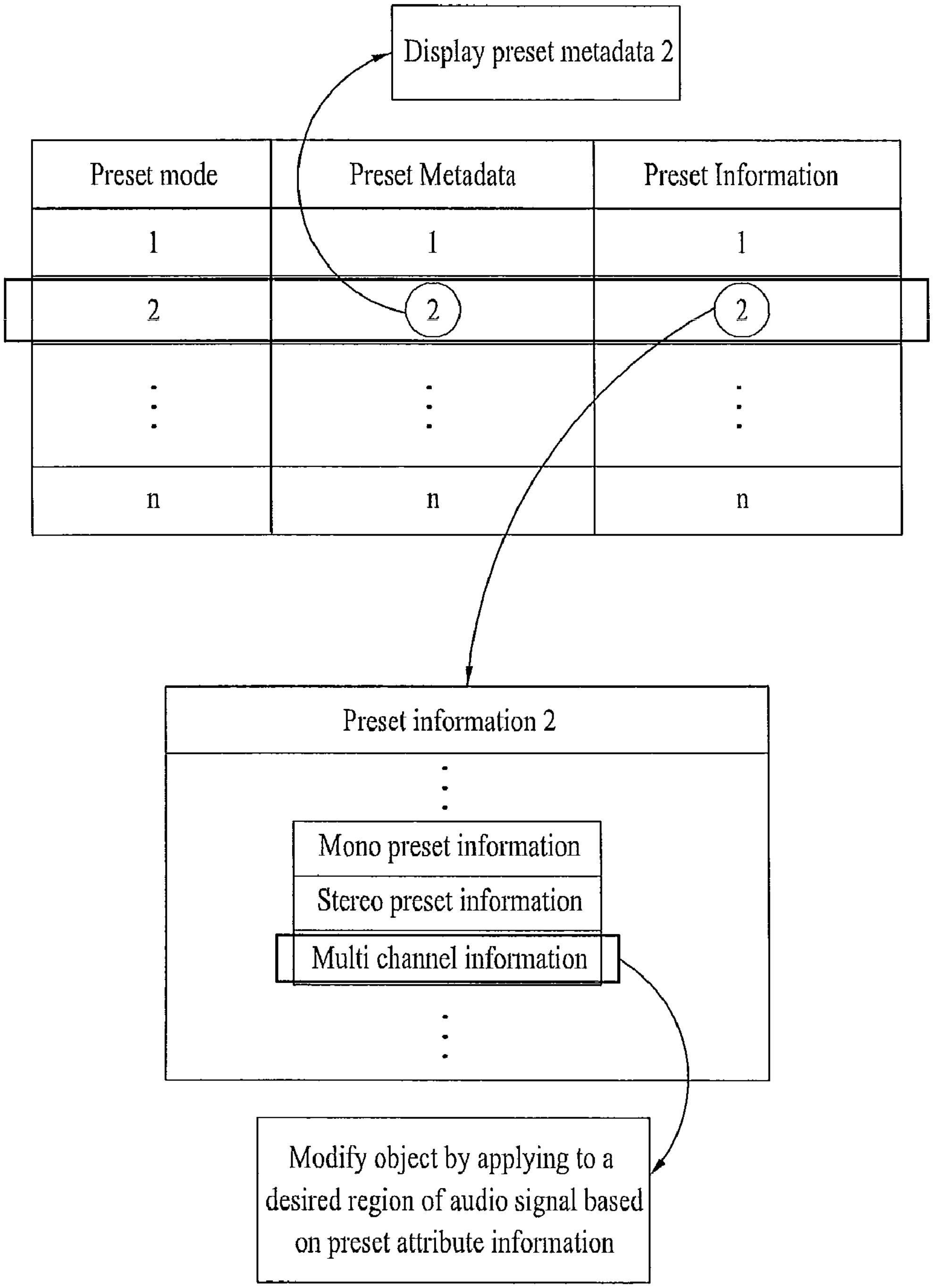
FIG. 1 is a conceptional diagram of a preset mode applied to an object included in a downmix signal according to one embodiment of the present invention.

FIG. 1 is a conceptional diagram of a preset mode applied to an object included in a downmix signal according to one embodiment of the present invention. In this disclosure, a set of information preset to adjust the object is named a preset mode. The preset mode can indicate one of various modes selectable by a user according to a characteristic of an audio signal or a listening environment. And, at least one preset mode can exist. Moreover, the preset mode includes preset information applied to adjust the object and preset metadata for representing an attribute of the preset information or the like. The preset metadata can be represented in a text. The preset metadata not only indicates an attribute (e.g., concert hall mode, karaoke mode, news mode, etc.) of the preset information but also includes such relevant information for representing the preset information as a writer of the preset information, a written date, a name of an object having the preset information applied thereto and the like. Meanwhile, the preset information is the data that is substantially applied to the object. The preset information corresponds to the preset metadata and can be represented in one of various forms. Particularly, the preset information can be represented in a matrix type.

Referring to FIG. 1, a preset mode 1 may be a concert hall mode for providing a sound stage effect that enables a listener to hear a music signal in a concert hall. Preset mode 2 can be a karaoke mode for reducing a level of a vocal object in an audio signal. And, preset mode n can be a news mode for raising a level of a speech object. Moreover, the preset mode includes preset metadata and preset information. If a user selects the preset mode 2, the karaoke mode of the preset metadata 2 will be displayed and it is able to adjust a level by applying the preset information 2 relevant to the preset metadata 2 to the object.

In this case, the preset information can include mono preset information, stereo preset information and multi-channel preset information. The preset information is determined according to an output channel of object. The mono preset information is the preset information applied if an output channel of the object is mono. The stereo preset information is the preset information applied if an output channel of the object is stereo. And, the multi-channel preset information is the preset information applied if an output channel of the object is a multi-channel. Once an output channel of the object is determined according to configuration information, a type of the preset information is determined using the determined output channel. It is then able to adjust a level or panning by applying the preset information to the object.

Figure 2A:
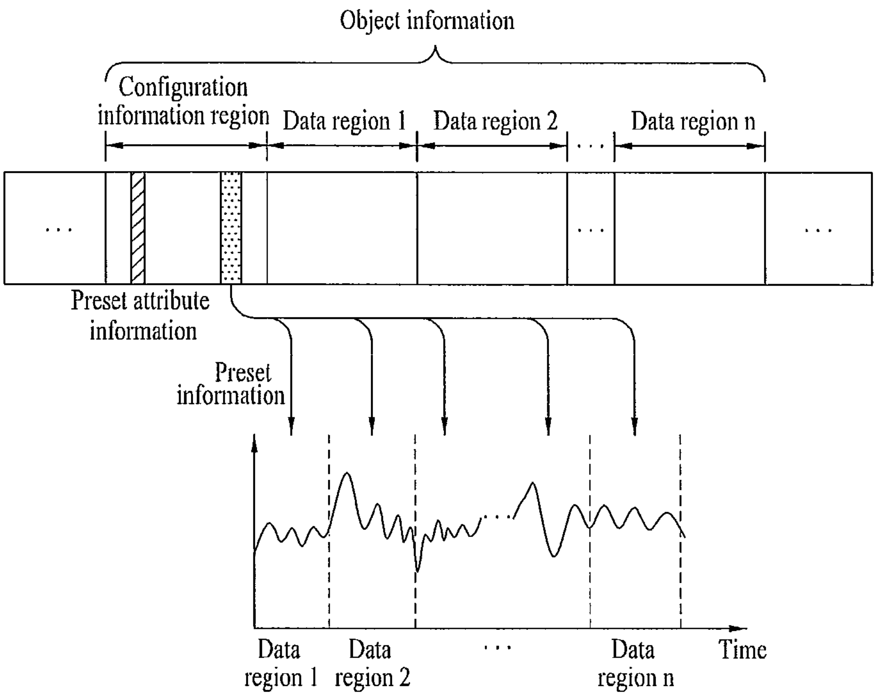
FIG. 2A and FIG. 2B are conceptional diagrams for adjusting an object included in a downmix signal by applying preset information based on preset attribute information according to one embodiment of the present invention.
Figure 2B:
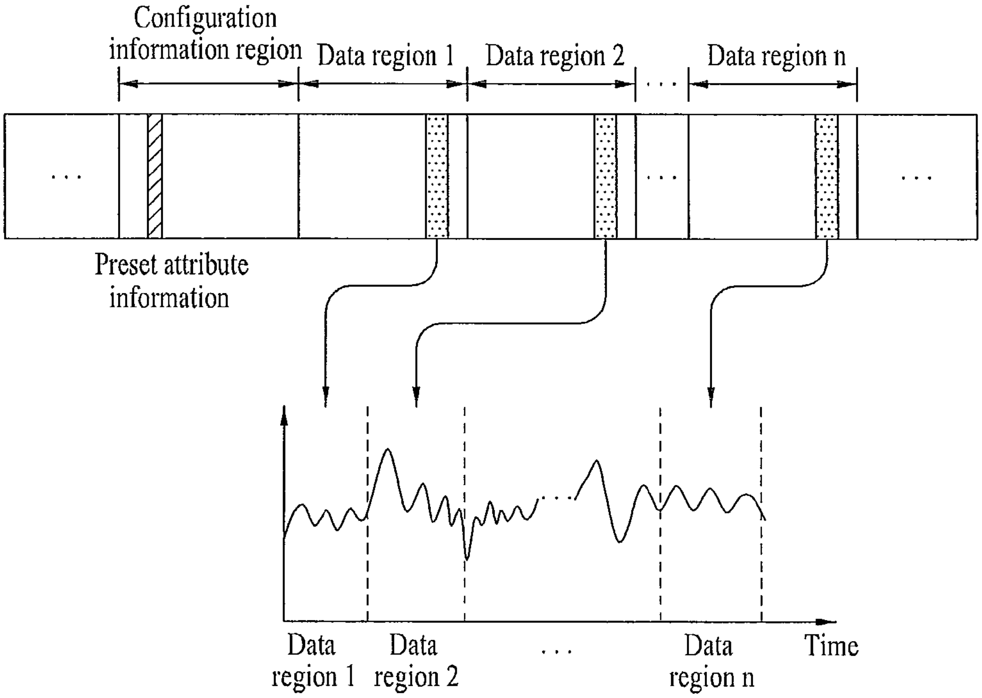

FIG. 2A and FIG. 2B are conceptional diagrams for adjusting an object included in a downmix signal by applying preset information according to preset attribute information according to one embodiment of the present invention.

First of all, an audio signal of the present invention is encoded into a downmix signal and object information by an encoder. The downmix signal and the object information are transferred as one bitstream or separate bitstreams to a decoder.

Referring to FIG. 2A and FIG. 2B, object information included in a bitstream specifically includes a configuration information region and a plurality of data regions 1 to n. The configuration information region is a region located at a head part of the bitstream of object information and includes information applied to all data regions of the object information in common. For instance, the object information can include configuration information containing a tree structure and the like, data region length information, object number information and the like. On the contrary, a data region is a unit resulting from dividing a time domain of a whole audio signal based on data region length information. A data region of the object information corresponds to a data region of the downmix signal and includes object information used to upmix the corresponding data region of the downmix signal. The object information includes object level information and object gain information and the like.

In an audio signal processing method according to one embodiment of the present invention, preset attribute information (preset_attribute_information) is first read from object information of a bitstream. The preset attribute information indicates preset information is included in which region of the bitstream. Preferably, the preset attribute information indicates whether preset information is included in a configuration information region of object information or a data region of object information. And, its details are shown in Table 1.

TABLE 1

| preset attribute information (preset_attribute_information) | meaning |
|---|---|
| 0 | Preset information is included in a configuration information region. |
| 1 | Preset information is included in a data region. |

Referring to FIG. 2A, if preset attribute information is set to 0 to indicate that preset information is included in a configuration information region, preset information extracted from the configuration information region is rendered by being equally applied to all data regions of a downmix signal.

Referring to FIG. 2B, if preset attribute information is set to 1 to indicate that preset information is included in a data region, preset information extracted from the data region is rendered by being applied to one corresponding data region of a downmix signal. For instance, preset information extracted from a data region 1 is applied to a data region 1 of a downmix signal. And, preset information extracted from a data region n is applied to a data region n of a downmix signal.

In addition, preset attribute information indicates that the preset information is dynamic or static. If preset attribute information is set to 0 to indicate that preset information is included in a configuration information region, the preset information may be static. On the one hand, if preset attribute information is set to 1 to indicate that preset information is included in a data region, the preset information may be dynamic. In this case, because the preset information may render one corresponding data region of a downmix signal by applying to one corresponding data region, data region unit is dynamic applied. Preferably, the preset information exists in an extension region of a data region in case of dynamic and the preset information exists in an extension region of a configuration information region in case of static.

Therefore, an audio signal processing method according to one embodiment of the present invention is able to upmix a downmix signal using suitable preset information per data region or same preset information for all data regions according to a characteristic of a sound source based on preset attribute information.

Figure 3:
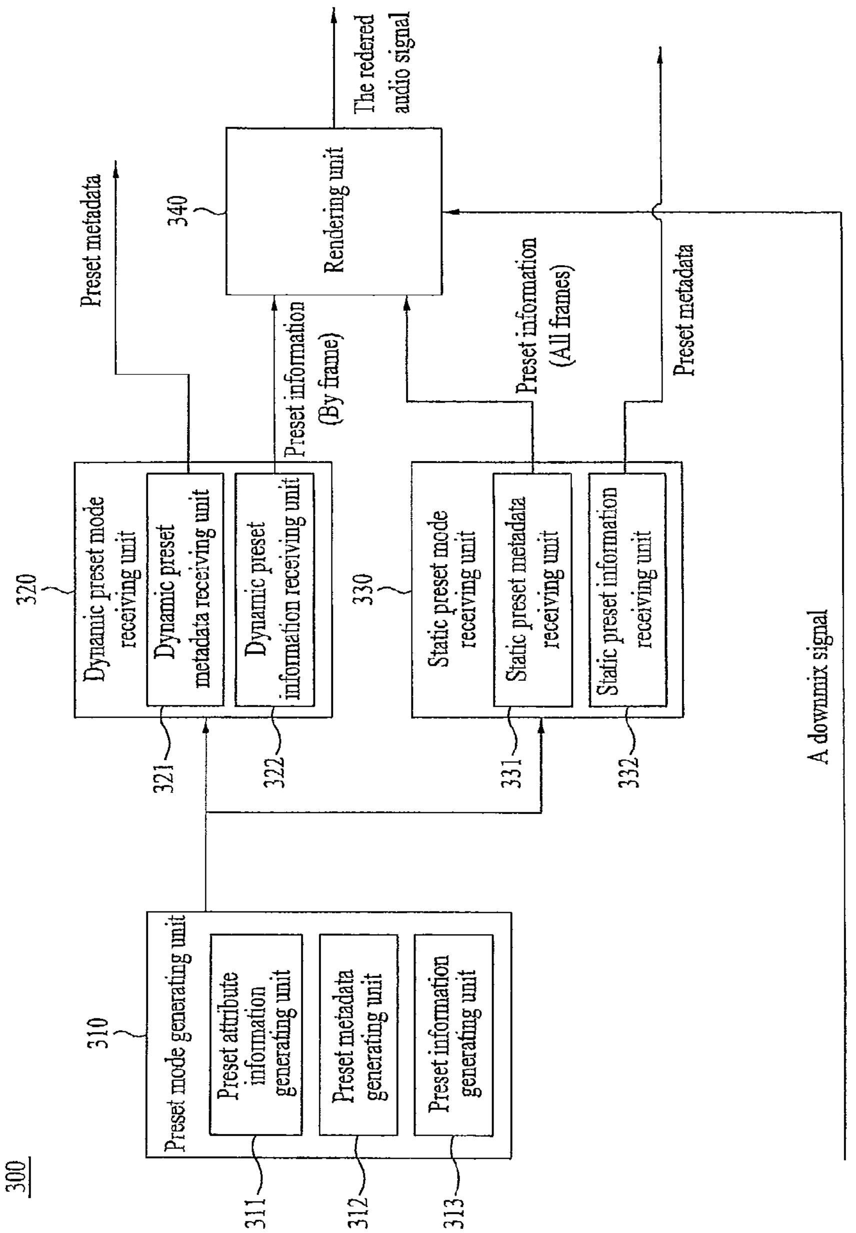
FIG. 3 is a block diagram of an audio signal processing apparatus according to one embodiment of the present invention.

FIG. 3 is a block diagram of an audio signal processing apparatus 300 according to an embodiment of the present invention.

Referring to FIG. 3, an audio signal processing apparatus 300 can include a preset mode generating unit 310, an information receiving unit (not shown in the drawing), a dynamic preset mode receiving unit 320, a static preset mode information 330 and an rendering unit 340.

The preset mode generating unit 310 generates a preset mode for adjustment in rendering an object included in an audio signal and is able to include a preset attribute determining unit 311, a preset metadata generating unit 312 and a preset information generating unit 313.

As mentioned in the foregoing description, the preset attribute determining unit 311 determines preset attribute information indicating whether preset information is applied to all data regions of a downmix signal by being included in a configuration information region or per a data region of a downmix signal by being included in a data region.

Subsequently, the preset metadata generating unit 312 and the preset information generating unit 313 are able to generate one preset metadata and preset information or a plurality of preset metadata and preset information amounting to the number of data regions of a downmix signal.

The preset metadata generating unit 312 is able to generate preset metadata by receiving an input of text to represent the preset information. On the contrary, if a gain for adjusting a level of the object and/or a position of the object is inputted to the preset information generating unit 313, the preset information generating unit 313 is able to generate preset information that will be applied to the object.

The preset information can be generated to be applicable to each object. The preset information can be implemented in various types. For instance, the present information can be implemented into a channel level difference (CLD) parameter, a matrix or the like.

The preset information generating unit 313 is able to further generate output channel information indicating the number of output channels of the object.

The preset metadata generated by the preset metadata generating unit 312 and the preset information, the output channel information and the like generated by the preset information generating unit 313 can be transferred in a manner of being included in one bitstream. Preferably, they can be transferred in a manner of being included in an ancillary region of a bitstream that includes a downmix signal.

Meanwhile, the preset mode generating unit 312 is able to further generate preset presence information indicating that the preset information and the output channel information are included in the bitstream. In this case, the preset presence information can be represented in a container type indicating the preset information or the like is included in which region of the bitstream. Alternatively, the preset presence information can be represented in a flag type that simply indicates whether the preset information or the like is included in the bitstream instead of indicating a prescribed region. And, the preset presence information can be further implemented in various types.

The preset mode generating unit 312 is able to generate a plurality of preset modes. Each of the preset modes includes the preset information, the preset metadata and the output channel information. In this case, the preset mode generating unit 312 is able to further generate preset number information indicating the number of the preset modes.

Thus, the preset mode generating unit 310 is able to generate and output preset attribute information, preset metadata and preset information in a format of bitstream.

As shown in FIG. 2A or FIG. 2B, the bitstream is inputted to the information receiving unit (not shown in the drawing). The preset attribute information is obtained from the bitstream inputted to the information receiving unit (not shown in the drawing). It is then determined that the preset information is included in which region of the transferred bitstream.

The dynamic preset mode receiving unit 320 is activated if the preset information is included in the data region ('preset_attribute_flag=1' shown in Table 1) based on the preset attribute information outputted from the preset attribute determining unit 311.

And, the dynamic preset mode receiving unit 320 can include a dynamic preset metadata receiving unit 321 receiving preset metadata corresponding to a corresponding a data region and a dynamic preset information receiving unit 322 receiving per-data region preset information. The dynamic preset metadata receiving unit 321 receives selected metadata and then outputs the received metadata. The dynamic preset information receiving unit 322 receives the preset information. And, relevant details will be explained in detail with reference to FIGS. 4A to 5 later.

The static preset mode receiving unit 330 is activated if the preset information is included in the configuration information region ('preset_attribute_flag=0' shown in Table 1) based on the preset attribute information.

And, the static preset mode receiving unit 330 can include a static preset metadata receiving unit 331 receiving preset metadata corresponding to all data regions and a static preset information receiving unit 332 receiving preset information.

Although the static preset metadata receiving unit 331 and the static preset information receiving unit 332 of the static preset mode receiving unit 330 have the same configurations and functions of the dynamic preset metadata receiving unit 321 and the dynamic preset information receiving unit 322 of the dynamic preset mode receiving unit 320, they differ from each other in a range of a downmix signal corresponding to the received and outputted preset information and metadata.

The rendering unit 340 receives a downmix signal generated from downmixing an audio signal including a plurality of objects and the preset information outputted from the dynamic preset information receiving unit 322 or an input of the preset information outputted from the static preset information receiving unit 332. In this case, the preset information is used to adjust a level or position of the object by being applied to the object included in the downmix signal.

In case that the audio signal processing apparatus 300 includes a display unit (not shown in the drawing), the selected preset metadata outputted from the dynamic preset metadata receiving unit 321 or the selected preset metadata outputted from the static preset metadata receiving unit 331 can be displayed on a screen of the display unit.

Figure 4A:
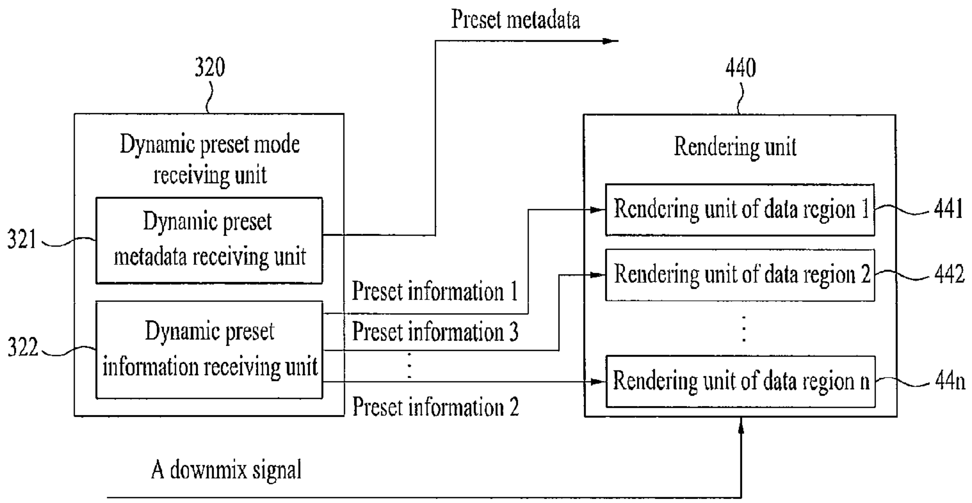
FIG. 4A and FIG. 4B are block diagrams for a method of applying preset information to an rendering unit according to one embodiment of the present invention.
Figure 4B:
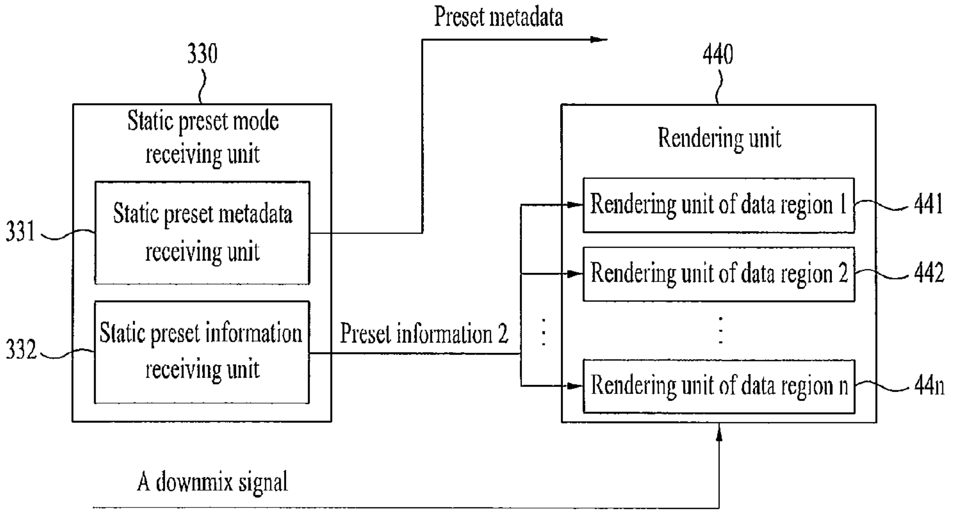

FIG. 4A and FIG. 4B are block diagrams for a method of applying preset information to an rendering unit according to one embodiment of the present invention.

FIG. 4A shows a method of applying preset information outputted from a dynamic preset mode receiving unit 320 in an rendering unit 440. The dynamic preset mode receiving unit 320 shown in FIG. 4A is equal to the former dynamic preset mode receiving unit 320 shown in FIG. 3 and includes a dynamic preset metadata receiving unit 321 and a dynamic preset information receiving unit 322.

The dynamic preset mode receiving unit 320 receives and outputs preset metadata and preset information per a data region. The preset information is then inputted to the rendering unit 440.

The rendering unit 440 performs rendering per a data region by receiving a downmix signal as well as the preset information. And, the rendering unit 440 includes a rendering unit of data region 1, a rendering unit of data region 2, a rendering unit of data region n. In this case, each rendering unit of data region 44X of the rendering unit 440 performs rendering in a manner of receiving an input of the preset information corresponding to each data region and then applying the input to the downmix signal.

For instance, preset information_1, which is a stadium mode, is applied to a data region 1. Preset information_3, which is a karaoke mode, is applied to a data region 2. And, preset information_2, which is a news mode, is applied to a data region 6. In this case, 'n' in preset information_n indicates an index of a data region mode. Meanwhile, it is understood that preset metadata is outputted per a data region as well.

FIG. 4B shows a method of applying preset information outputted from a static preset mode receiving unit 330 in a rendering unit 440. The static preset mode receiving unit 330 shown in FIG. 4B is equal to the former static preset mode receiving unit 330 shown in FIG. 3.

The static preset mode receiving unit 330 receives and outputs preset metadata and preset information corresponding to all data regions of a downmix signal. The preset information is then inputted to the rendering unit 440.

The rendering unit 440 shown in FIG. 4B includes a plurality of rendering unit of data region 44X amounting to the number of data regions like the former rendering unit shown in FIG. 4A. In case of receiving the preset information from the static preset mode receiving unit 330, the rendering unit 440 performs rendering in a manner that the all rendering units of data region 44X equally applies the received preset information to the downmix signal.

For instance, if the preset information outputted from the static preset information receiving unit 332 is preset information 2 indicating a news mode, the news mode is applicable to all data regions including 1 to $n^{th}$ data regions.

Figure 5:
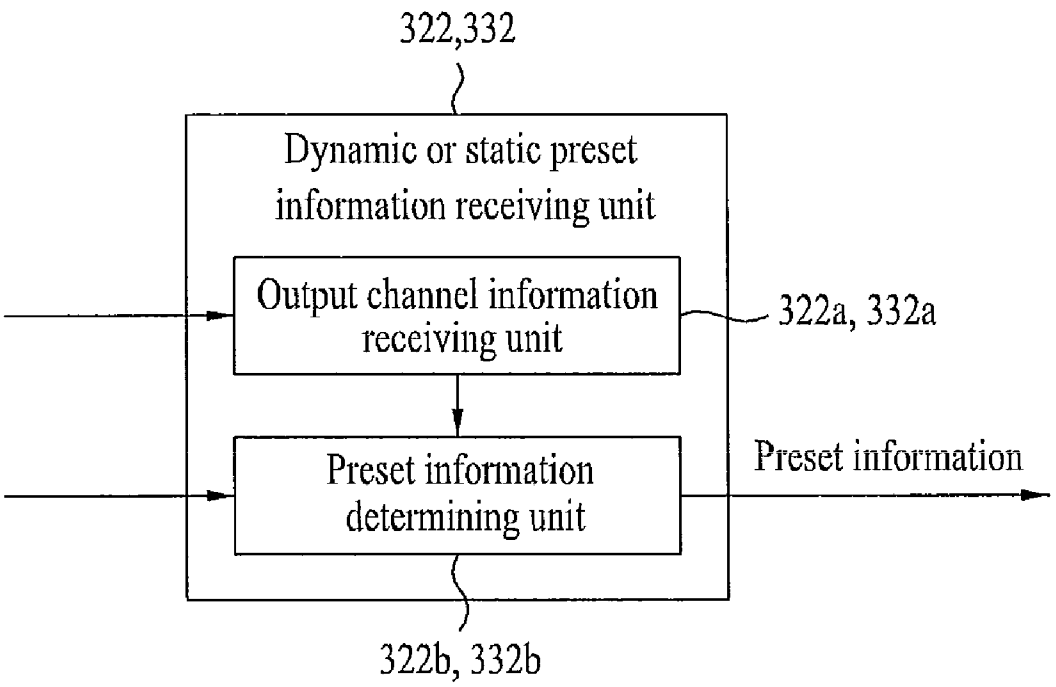
FIG. 5 is a schematic block diagram of a dynamic preset information receiving unit and a static preset information receiving unit according to another embodiment of the present invention.

FIG. 5 is a schematic block diagram of a dynamic preset information receiving unit 322 included in a dynamic preset mode receiving unit 320 and a static preset information receiving unit 332 included in a static preset mode receiving unit 330 of an audio signal processing apparatus 300 of the present invention.

Referring to FIG. 5, a dynamic/static preset information receiving unit 322/332 includes an output channel information receiving unit 322*a*/332*a* and a preset information determining unit 322*b*/332*b*.

The output channel information receiving unit 322*a*/332*a* receives output channel information indicating the number of output channels from which an object included in a downmix signal will be reproduced and then outputs the received output channel information. In this case, the output channel information may include a mono channel, a stereo channel or a multi-channel (e.g., 5.1 channel), by which the present invention is non-limited.

The preset information determining unit 322*b*/332*b* receives corresponding preset information based on the output channel information inputted from the output channel information receiving unit 322*a*/332*a* and then outputs the received preset information. In this case, the preset information may include one of mono preset information, stereo preset information or multi-channel preset information.

In case that the preset information has a matrix type, a dimension of the preset information can be determined based on the number of objects and the number of output channels. And, the preset matrix can have a format of '(object number) * (output channel number)'. For instance, if the number of objects included in a downmix signal is 'n' and an output channel from the output channel information receiving unit 322*a*/332*a* is 5.1 channel, i.e., six channels, the preset information determining unit 322*b*/332*b* is able to output multichannel preset information implemented into a type of 'n*6'. In this case, an element of the matrix is a gain value indicating an extent that an $a^{th}$ object is included in an $i^{th}$ channel.

Figure 6:
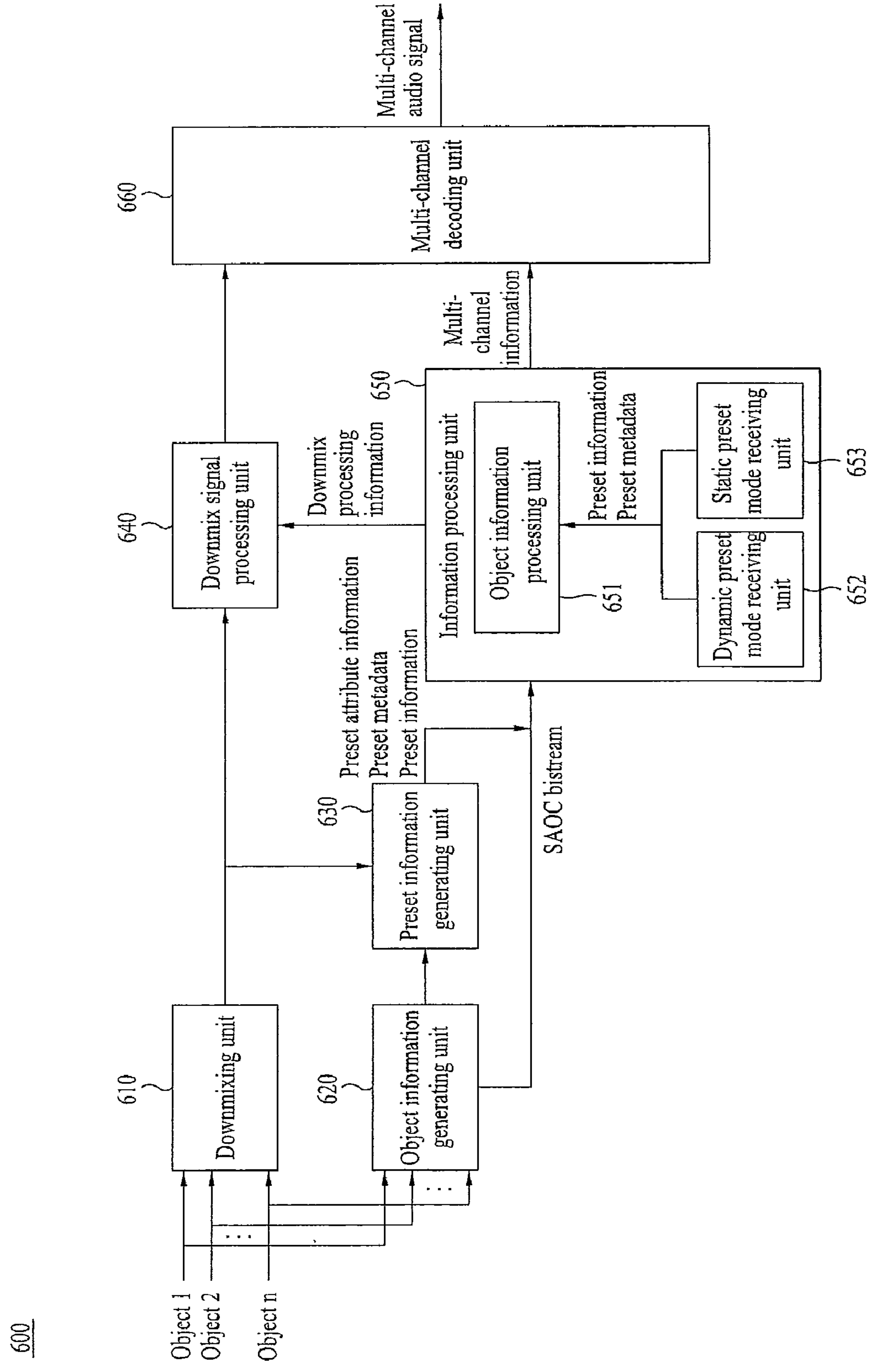
FIG. 6 is a block diagram of an audio signal processing apparatus according to another embodiment of the present invention.

FIG. 6 is a block diagram of an audio signal processing apparatus 600 according to another embodiment of the present invention.

Referring to FIG. 6, an audio signal processing apparatus 600 mainly includes a downmixing unit 610, an object information generating unit 620, a preset mode generating unit 630, a downmix signal processing unit 640, an information processing unit 650 and a multi-channel decoding unit 660.

A plurality of objects is inputted to the downmixing unit 610 to generate a mono downmix signal or a stereo downmix signal. And, a plurality of the objects is inputted to the object information generating unit 620 to generate object information. The object information may include object level information indicating levels of the objects, object gain information including a gain value of the object included in a downmix signal and an extent of the object included in a downmix channel in case of a stereo downmix signal and object correlation information indicating a presence or non-presence of inter-object correlation.

Subsequently, the downmix signal and the object information are inputted to the preset mode generating unit 630 to generate a preset mode which includes preset attribute information indicating whether preset information is included in a data region or a configuration information region of a bitstream, preset information for adjusting a level of object and preset metadata for representing the preset information. A process for generating the preset attribute information, the preset information and the preset metadata is equal to the former descriptions of the audio signal processing apparatus and method explained with reference to FIGS. 1 to 5 and its details will be omitted for clarity.

The preset mode generating unit 630 is able to further generate preset presence information indicating whether the preset information is present in the bitstream, preset number information indicating the number of preset informations and preset metadata length information indicating a length of the preset metadata.

The object information generated by the object information generating unit 620 and the preset attribute information, preset information, preset metadata, preset presence information, preset number information and preset metadata length information generated by the preset mode generating unit 630 can be transferred in a manner of being included in SAOC bitstream or can be transferred in one bitstream including the downmix signal as well. In this case, the bitstream including the downmix signal and the preset relevant informations therein can be inputted to a signal receiving unit (not shown in the drawing) of a decoding apparatus.

The information processing unit 650 includes an object information processing unit 651, a dynamic preset mode receiving unit 652 and a static preset mode receiving unit 653 and receives SAOC bitstream. As mentioned in the foregoing description with reference to FIGS., 2 to 5, whether the SAOC bitstream is inputted to the dynamic preset mode receiving unit 652 or the static preset mode receiving unit 653 is determined based on the preset attribute information included in the SAOC bitstream.

The dynamic preset mode receiving unit 652 or the static preset mode receiving unit 653 receives the preset attribute information, the preset presence information, the preset number information, the preset metadata, the output channel information and the preset information (e.g., preset matrix) via the SAOC bitstream and uses the methods according to various embodiments for the audio signal processing method and apparatus described with reference to FIGS. 1 to 5.

The dynamic preset mode receiving unit 652 or the static preset mode receiving unit 653 outputs the preset metadata and the preset information.

The object information processing unit 651 receives the outputted preset metadata and preset information and then generates downmix processing information for pre-processing the downmix signal and multi-channel information for rendering the downmix signal using the received preset metadata and preset information together with the object information included in the SAOC bitstream. In this case, the preset information and preset metadata outputted from the dynamic preset mode receiving unit 652 correspond to one data region of a downmix signal, whereas the preset information and preset metadata outputted from the static preset mode receiving unit 653 correspond to all data regions of a downmix signal.

Subsequently, the downmix processing information is inputted to the downmix signal processing unit 640 to perform panning by varying a channel in which the object included in the downmix signal is included. The pre-processed downmix signal is upmixed by being inputted to the multi-channel decoding unit 660 together with the multi-channel information outputted from the information processing unit 650, whereby a multi-channel audio signal is generated.

Thus, in an audio signal processing apparatus of the present invention, when a downmix signal including a plurality of objects is decoded into a multi-channel signal using object information, it is facilitated to adjust a level of object by further using preset information and preset metadata which are previously set up. Moreover, it is able to enhance a stage sound effect suitably according to a characteristic of a sound source in a manner that the preset information applied to the object is separately applied per a data region based on preset attribute information or is equally applied to all data regions.

FIGS. 7 to 11 are various syntaxs relevant to preset information in an audio signal processing method according to another embodiment of the present invention.

Referring to FIG. 7, information relevant to preset information can exist in a configuration information region (SAOCSpecificConfig( )) of a bitstream.

First of all, it is able to preset number information (bsNumPresets) from the configuration information region of the bitstream. And, it is also able to obtain output channel information (bsPresetLevel [i]) indicating an output channel of a preset information applied object per preset information ($i^{th}$ preset information) based on the preset number information. Meanings of the output channel information are represented in Table 2.

TABLE 2

| bsPresetLevel[i] | Meaning |
|---|---|
| 0 | Gain only |
| 1 | Stereo panning |
| 2 | Multichannel panning |
| 3 | Reserved |

Subsequently, it is able to obtain preset attribute information (bsPresetDynamic [i]) indicating whether the present information is included in a configuration information region or a data region. In case that the preset attribute information (bsPresetDynamic [i]) is set to 0, as shown in FIG. 7, it indicates a static preset mode. And, preset information (getpreset ( )) for adjusting an object level or panning of a downmix signal to correspond to all data regions of a downmix signal. In this case, preset metadata (PresetMetaData(numPresets)) can be included in the configuration information region to correspond to the preset information as well. Meanings of the preset attribute information are represented in Table 3.

TABLE 3

| bsPresetDynamic[i] | Meaning |
|---|---|
| 0 | Time invariant(static) |
| 1 | Time varying(dynamic) |

FIG. 8 shows syntax for data region information in case that the preset attribute information (bsPresetDynamic [i]) shown in FIG. 7 is included in a data region.

Referring to FIG. 8, if the preset attribute information (bsPresetDynamic [i]) shown in FIG. 7 is set to 1, it deviates from 'if(!bsPresetDynamic [i])'. Hence preset information is not obtained from a configuration information region. Thereafter, as shown in FIG. 8, since a condition of (SAOCFrame ( )(if(bsPresetDynamic[i]) is satisfied in a data region, it is able to obtain preset information (getPreset( )). As the preset information obtained from the data region, unlike the former preset information shown in FIG. 7 is equally applied to all data regions, the latter preset information can be applied to the corresponding data region only.

Meanwhile, in FIG. 7 and FIG. 8, although the preset information is included in the configuration information region (SAOCSpecificConfig( )) and the data region (SAOCFrame( )), it can be also included in a configuration information region extension region (SAOCExtensionConfig( )) and a data region extension region (SAOCEXtensionFrame( )).

In this case, the preset information included in an extension region of the configuration information region and an extension region of the data region is equal to the former preset information described with reference to FIG. 7 and FIG. 8. Moreover, the extension region of the configuration information region and the extension region of the data region can further include preset metadata, output channel information, preset presence information and the like corresponding to the preset information as well as the preset information.

FIG. 9 shows a syntax indicating preset information according to another embodiment of the present invention.

Referring to FIG. 9, preset information may be generated by using EcData. On the contrary, the preset information is able to use a method of transferring to use a gain value itself instead of using EcData. And, this preset information can be quantized using a channel level difference (CLD) table or another independent table.

FIG. 10 shows a syntax indicating preset metadata according to another embodiment of the present invention.

Referring to FIG. 10, preset metadata firstly obtains preset metadata length information (bsNumCharMetaData[prst]) indicating a length of metadata corresponding to preset information. Thereafter, it is able to obtain preset metadata (bsMetaData[prst]) corresponding to each preset information based on the preset metadata length information.

Thus, by representing preset metadata representing preset information in a text type based on preset length information indicating a length of metadata, an audio signal processing method and apparatus according to the present invention can reduce unnecessary coding.

FIG. 11 shows a syntax of a data region including preset information according to a further embodiment of the present invention.

Referring to FIG. 11, based on the number of objects (numObjects), preset information is able to carry informations mapped to an output channel (numRenderingChannel[i]) per object. The present information, as shown in FIG. 11, can be obtained from a data region of a bitstream. In case that preset information is included in a data region extension region, it can be obtained from the data region extension region (SAOCExtensionFrame( )). In case that preset information is included in a configuration information region of a bitstream, it can be obtained from the configuration information region.

Figure 12:
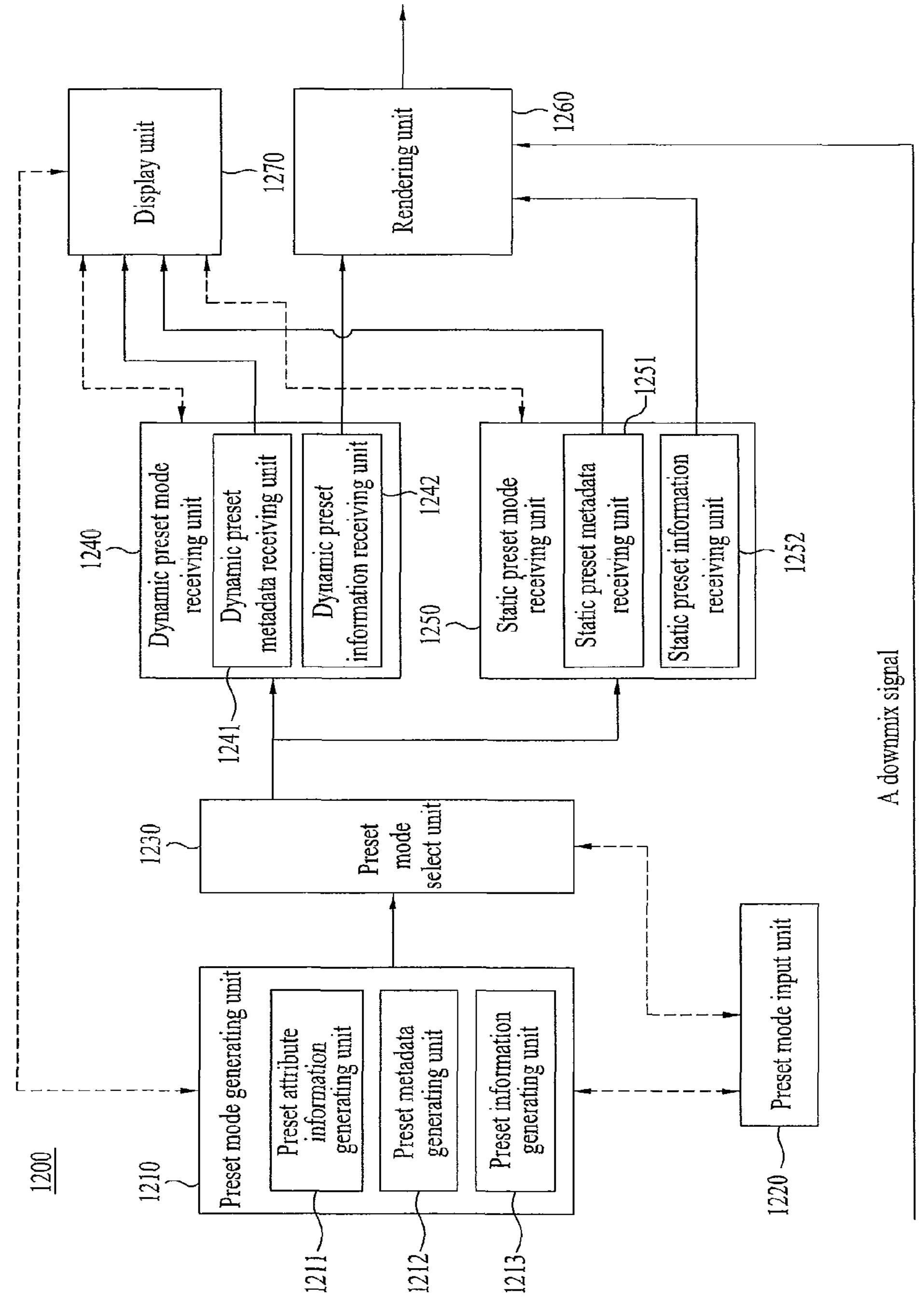
FIG. 12 is a block diagram of an audio signal processing apparatus according to a further embodiment of the present invention.

FIG. 12 is a block diagram of an audio signal processing apparatus 1200 according to a further embodiment of the present invention.

Referring to FIG. 12, an audio signal processing apparatus 1200 mainly includes a preset mode generating unit 1210, an information receiving unit (not shown in the drawing), a preset mode input unit 1220, a preset mode select unit 1230, a dynamic preset mode receiving unit 1240, a static preset mode receiving unit 1250, an rendering unit 1260 and a display unit 1270.

The preset mode generating unit 1210, the information receiving unit (not shown in the drawing), the dynamic preset mode receiving unit 1240, the static preset mode receiving unit 1250 and the rendering unit 1260 shown in FIG. 12 have the same configurations and functions of the preset mode generating unit 310, the dynamic preset mode receiving unit 320, the static preset mode receiving unit 330 and the rendering unit 340 shown in FIG. 3 and their details are omitted in this disclosure.

Referring to FIG. 12, the preset mode input unit 1220 displays a plurality of preset metadata received from the preset metadata generating unit 1212 on a display unit(1270) and then receives an input of a select signal for selecting one of a plurality of the preset metadata. The preset mode select unit 1230 selects one of preset metadata by the select signal and preset information corresponding to the preset metadata.

In this case, if preset attribute information (preset_attribute_information) received from the preset attribute determining unit 1211 indicates that preset information is included in a data region, the preset metadata selected by the select unit 1230 and the preset information corresponding to the preset metadata are inputted to a preset metadata receiving unit 1241 and a preset information receiving unit 1242 of the dynamic preset mode receiving unit 1240, respectively. In doing so, a display unit 1270, a preset mode input unit 1220 and a preset mode select unit 1230 may repeat the above operation as many as the number of data regions.

On the contrary, if preset attribute information (preset_attribute_information) received from the preset attribute determining unit 1211 indicates that preset information is included in a configuration information region, the preset metadata selected by a preset mode select unit 1220 and the preset information corresponding to the preset metadata are inputted to a preset metadata receiving unit 1251 and a preset information receiving unit 1252 of the static preset mode receiving unit 1250, respectively.

Besides, the selected preset metadata is outputted to the display unit 1270 to be displayed, whereas the selected preset information is outputted to the rendering unit 1260.

The display unit 1270 can be same as a unit displaying a plurality of preset metadatas so that a preset mode input unit 11220 may be inputted a select signal. Meanwhile, the display unit 1270 can be different from a unit displaying a plurality of preset metadatas. In case that the display unit 1270 and the preset mode input unit 1220 use the same unit, it is able to discriminate each operation in a manner that a description displayed on the screen (e.g., 'select a preset mode', 'preset mode X is selected', etc.), a visual object, a characters and the like are configured differently.

Figure 13:
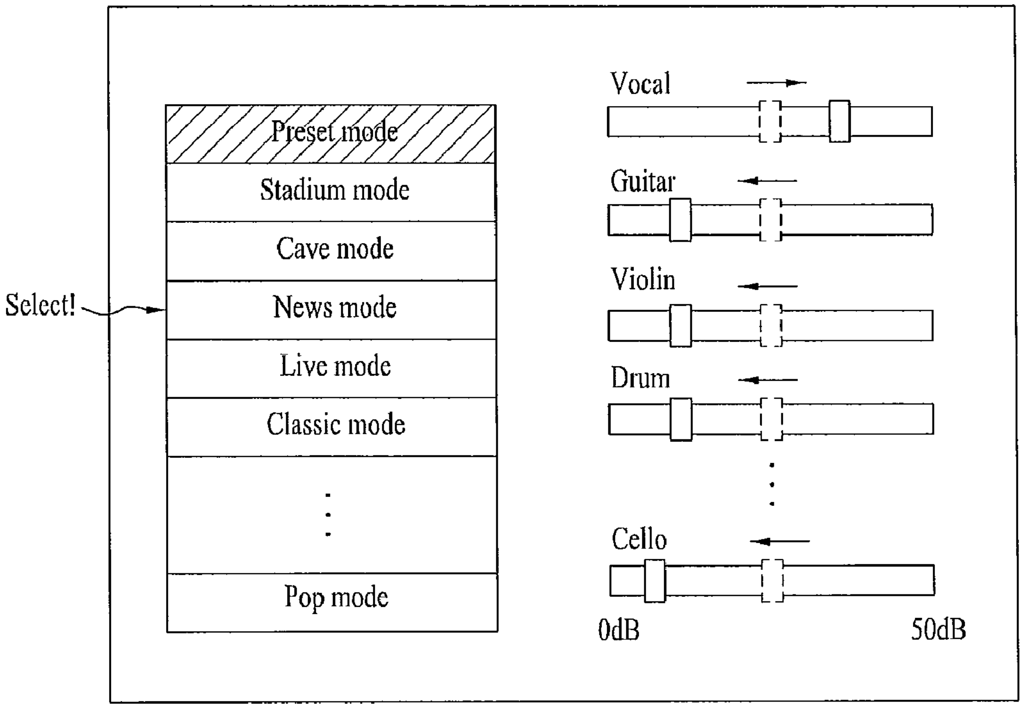
FIG. 13 is a block diagram for an example of a display unit of an audio signal processing apparatus according to a further embodiment of the present invention.

FIG. 13 is a block diagram for an example of a display unit 1270 of an audio signal processing apparatus 1200 according to a further embodiment of the present invention.

First of all, a display unit 12760 can include selected preset metadata and at least one or more graphic elements indicating levels or positions of objects, which are adjusted using preset information corresponding to the preset metadata.

Referring to FIG. 13, in case that a news mode is selected via the preset mode select unit 1230 from a plurality of preset metadata (e.g., stadium mode, cave mode, news mode, live mode, etc.) displayed on the displaying unit 1270 shown in FIG. 12, preset information corresponding to the news mode is applied to each object included in a downmix signal. In this case, a level of vocal will be raised, while levels of outer objects (guitar, violin, drum, . . . , cello) will be reduced.

The graphic element included in the display unit 1270 is transformed to indicate activation or change of the level or position of the corresponding object. For instance, shown as FIG. 13, a switch of a graphic element indicating a vocal is shifted to the right, while switches of graphic elements indicating the reset of the objects are shifted to the left.

The graphic element is able to indicate a level or position of object adjusted using preset information in various ways. At least one graphic element indicating each object can exist. In this case, a first graphic element indicates a level or position of object prior to applying the preset information. And, a second graphic element is able to indicate a level or position of object adjusted by applying the preset information thereto. In this case, it is facilitated to compare levels or positions of object before and after applying the preset information. Therefore, a user is facilitated to be aware how the preset information adjusts each object.

Figure 14:
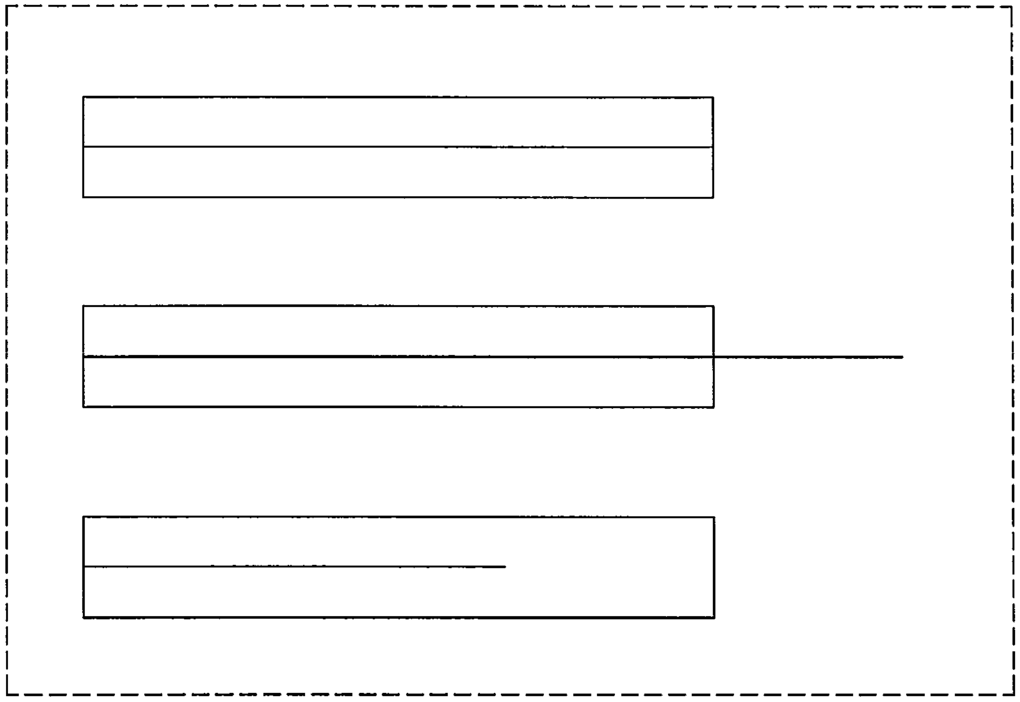
FIG. 14 is a diagram of at least one graphic element for displaying preset information applied objects according to a further embodiment of the present invention.

FIG. 14 is a diagram of at least one graphic element for displaying preset information applied objects according to a further embodiment of the present invention.

Referring to FIG. 14, a first graphic element has a bar type and a second graphic element can be represented as an extensive line within the first graphic element. In this case, the first graphic element indicates a level or position of object prior to applying preset information. And, the second graphic element indicates a level or position of object adjusted by applying preset information.

As shown in FIG. 14, a graphic element in an upper part indicates a case that a level of object prior to applying preset information is equal to that after applying preset information. A graphic element in a middle part indicates that a level of object adjusted by applying preset information is greater than that prior to applying preset information. And, a graphic element in a lower part indicates that a level of object is lowered by applying preset information.

Thus, using at least one or more graphic elements indicating levels or position of object before and after applying preset information, a user is facilitated to be aware that how preset information adjusts each object. Moreover, a user is facilitated to recognize a feature of preset information to help the user to select a suitable preset mode if necessary.

Figure 15:
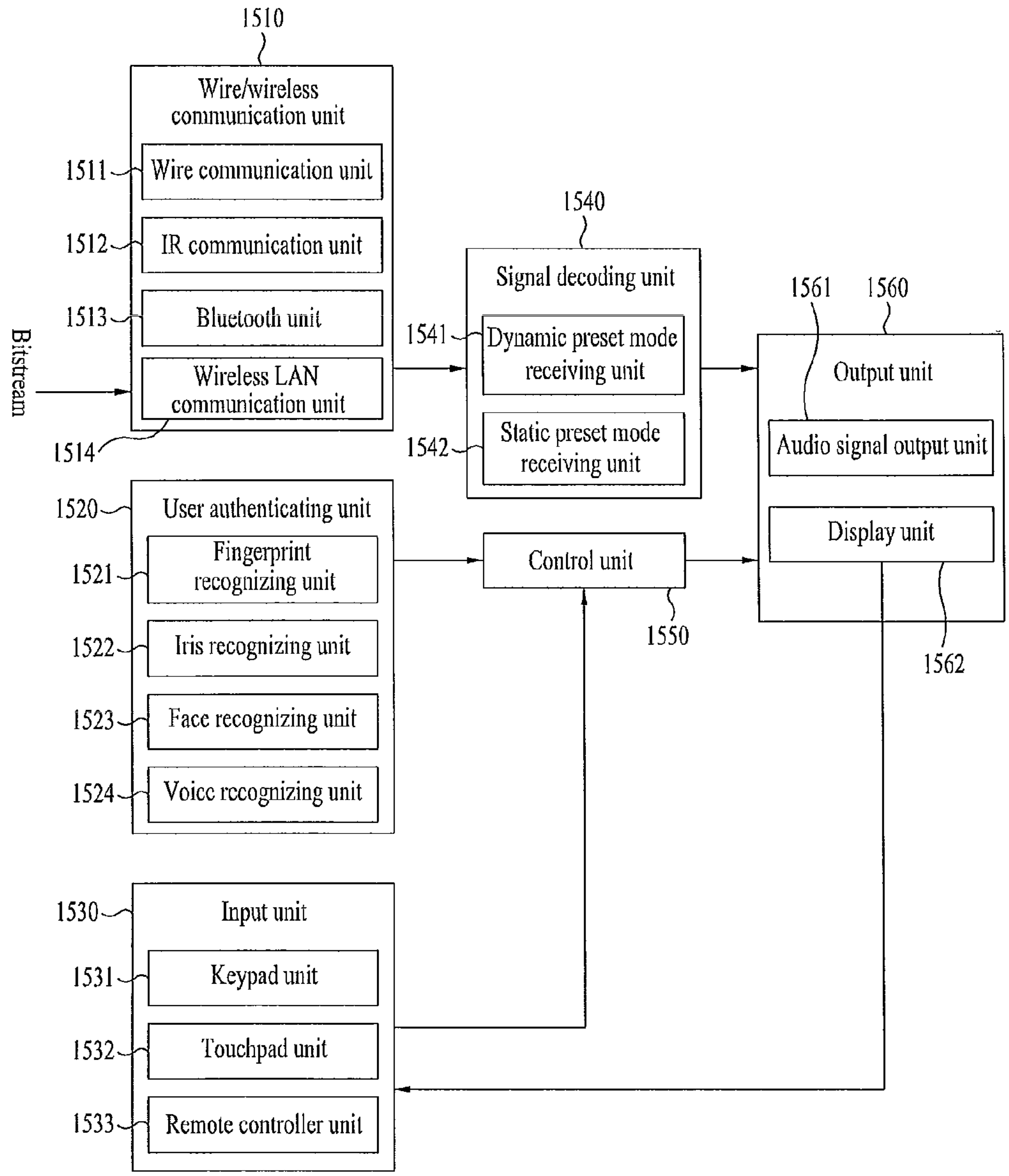
FIG. 15 is a schematic diagram of a product including a dynamic preset mode receiving unit and a static preset mode receiving unit according to a further embodiment of the present invention.
Figure 16A:
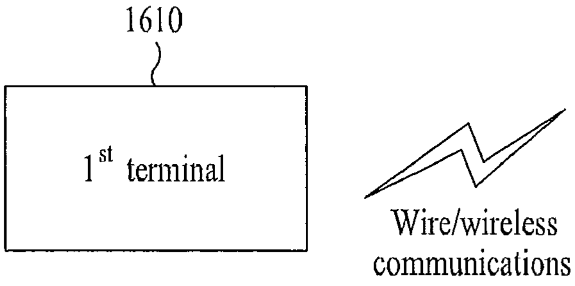
FIG. 16A and FIG. 16B are schematic diagrams for relations of products including a dynamic preset mode receiving unit and a static preset mode receiving unit according to a further embodiment of the present invention, respectively.
Figure 16B:
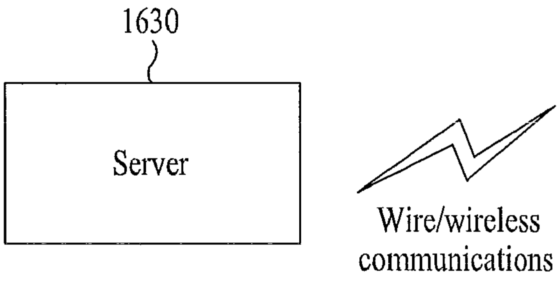

FIG. 15 is a schematic diagram of a product including a dynamic preset mode receiving unit and a static preset mode receiving unit according to a further embodiment of the present invention, and FIG. 16A and FIG. 16B are schematic diagrams for relations of products including a dynamic preset mode receiving unit and a static preset mode receiving unit according to a further embodiment of the present invention, respectively.

Referring to FIG. 15, a wire/wireless communication unit 1510 receives a bitstream by wire/wireless communications. In particular, the wire/wireless communication unit 1510 includes at least one of a wire communication unit 1511, an infrared communication unit 1512, a Bluetooth unit 1513 and a wireless LAN communication unit 1514.

A user authenticating unit 1520 receives an input of user information and then performs user authentication. The user authenticating unit 1520 can include at least one of a fingerprint recognizing unit 1521, an iris recognizing unit 1522, a face recognizing unit 1523 and a voice recognizing unit 1524. In this case, the user authentication can be performed in a manner of receiving an input of fingerprint information, iris information, face contour information or voice information, converting the inputted information to user information, and then determining whether the user information matches registered user data.

An input unit 1530 is an input device enabling a user to input various kinds of commands. And, the input unit 1530 can include at least one of a keypad unit 1531, a touchpad unit 1532 and a remote controller unit 1533, by which examples of the input unit 1530 are non-limited. Meanwhile, if preset metadata for a plurality of preset informations outputted from a metadata receiving unit 1541, which will be explained later, are visualized via a display unit 1562, a user is able to select the preset metadata via the input unit 1530 and information on the selected preset metadata is inputted to a control unit 1550.

A signal decoding unit 1540 includes a dynamic preset mode receiving unit 1541 and a static preset mode receiving unit 1542. The dynamic preset mode receiving unit 1541 receives preset information corresponding to each data region and preset metadata based on preset attribute information. And, the static preset mode receiving unit 1542 receives preset information and preset metadata corresponding to all data regions based on preset attribute information. Moreover, the preset metadata is received based on preset metadata length information indicating a length of metadata. And, the preset information is obtained based on preset presence information indicating whether preset information is present, preset number information indicating the number of preset informations and output channel information indicating that an output channel is one of a mono channel, a stereo channel and a multi-channel. If preset information is represented in a matrix, output channel information is received and a preset matrix is then received based on the received output channel information.

The signal decoding unit 1540 generates an output signal by decoding an audio signal using the received bitstream, preset metadata and preset information and outputs the preset metadata of a text type.

A control unit 1550 receives input signals from the input devices and controls all processes of the signal decoding unit 1540 and an output unit 1560. As mentioned in the foregoing description, if information on selected preset metadata is inputted as an input signal type to the control unit 1550 from the input unit 1530 and preset attribute information (preset_attribute_information) indicating whether preset information is included in a which region of the bitstream is inputted from the wire/wireless communication unit 1510, the dynamic preset mode receiving unit 1541 and the static preset mode receiving unit 1542 receive preset information corresponding to the selected preset metadata based on the preset attribute information and the input signal and then decodes the audio signal using the received preset information.

And, an output unit 1560 is an element for outputting an output signal and the like generated by the signal decoding unit 1540. The output unit 1560 can include a speaker unit 1561 and a display unit 1562. If an output signal is an audio signal, it is outputted via the speaker unit 1561. If an output signal is a video signal, it is outputted via the display unit 1562. Moreover, the output unit 1560 visualizes the preset metadata inputted from the control unit 1550 on a screen via the display unit 1562.

FIG. 16 shows relations between terminals or between a terminal and a server, each of which corresponds to the product shown in FIG. 15.

Referring to (A) of FIG. 16, it can be observed that bidirectional communications of data or bitstreams can be performed between a first terminal 1610 and a second terminal 1620 via wire/wireless communication units.

The data or bitstream communicated via wire/wireless communication unit can be a bitstream of FIG. 2A and FIG. 2B and data including preset attribute information, preset information and preset metadata as mentioned above description referring to FIG. 1 to FIG. 15.

Referring to (B) of FIG. 16, it can be observed that wire/wireless communications can be performed between a server 1630 and a first terminal 1640.

Figure 17:
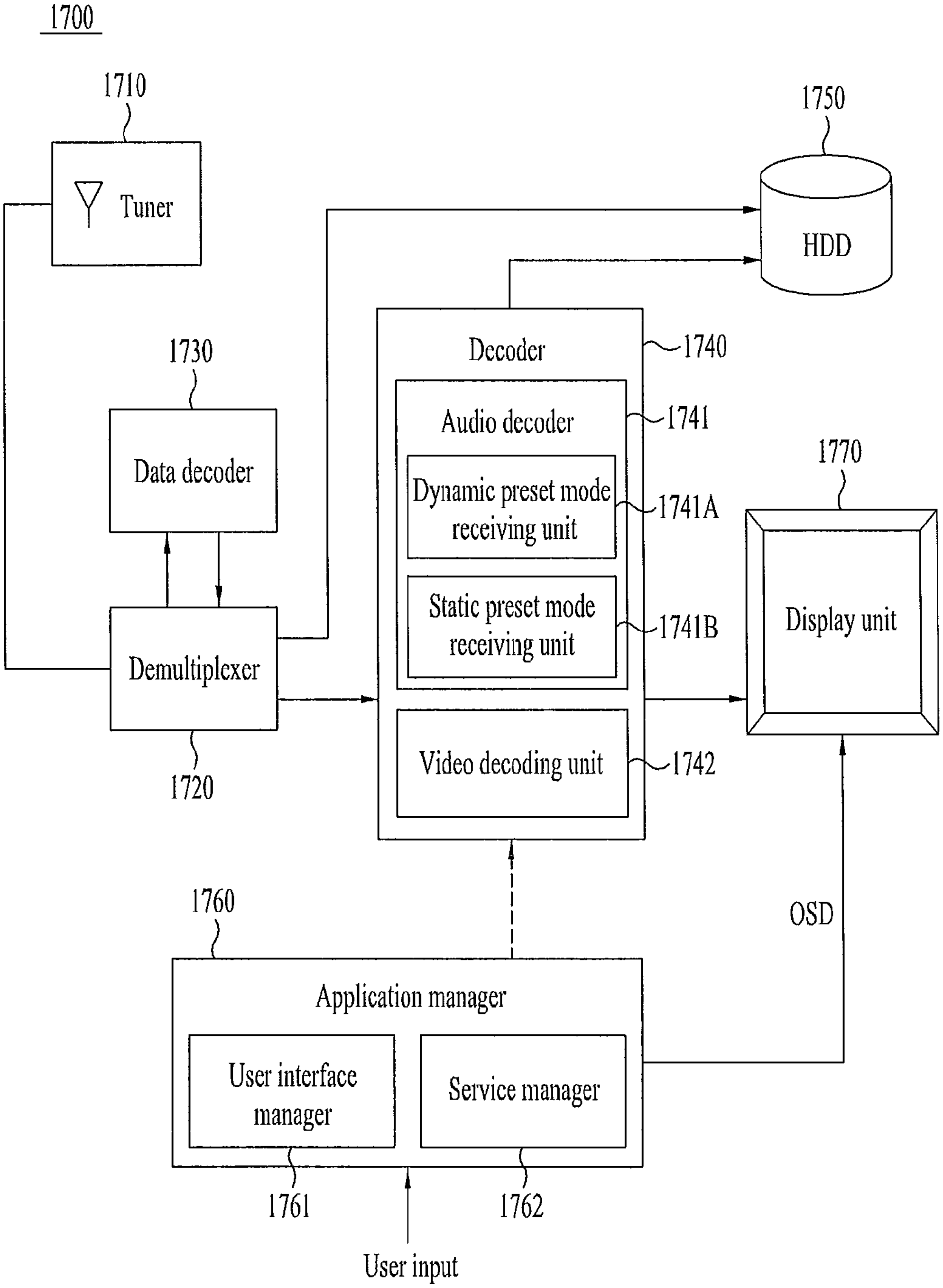
FIG. 17 is a schematic block diagram of a broadcast signal decoding apparatus including a dynamic preset mode receiving unit and a static preset mode receiving unit according to another further embodiment of the present invention.

FIG. 17 is a schematic block diagram of a broadcast signal decoding apparatus 1700, in which a preset receiving unit including a dynamic preset mode receiving unit and a static preset mode receiving unit according to one embodiment of the present invention is implemented.

Referring to FIG. 17, a demultiplexer 1720 receives a plurality of data related to a TV broadcast from a tuner 1710. The received data are separated by the demultiplexer 1720 and are then decoded by a data decoder 1730. Meanwhile, the data separated by the demultiplexer 1720 can be stored in such a storage medium 1750 as an HDD.

The data separated by the demultiplexer 1720 are inputted to a decoder 1740 including an audio decoder 1741 and a video decoder 1742 to be decoded into an audio signal and a video signal. The audio decoder 1741 includes a dynamic preset mode receiving unit 1741A and a static preset mode receiving unit 1741B according to one embodiment of the present invention. The dynamic preset mode receiving unit 1741A receives preset information and preset metadata corresponding to each data region based on preset attribute information. And, the static preset mode receiving unit 1741B receives preset information and preset metadata corresponding to all data regions based on preset attribute information.

Moreover, the preset metadata is received based on preset metadata length information indicating a length of metadata. And, the preset information is obtained based on preset presence information indicating whether preset information is present, preset number information indicating the number of preset informations and output channel information indicating that an output channel is one of a mono channel, a stereo channel and a multi-channel. If preset information is represented in a matrix, output channel information is received and a preset matrix is then received based on the received output channel information.

The signal decoding unit 1741 generates an output signal by decoding an audio signal using the received bitstream, preset metadata and preset information and outputs the preset metadata of a text type.

A display unit 1770 visualizes or displays the video signal outputted from the video decoder 1742 and the preset metadata outputted from the audio decoder 1741. The display unit 1770 includes a speaker unit (not shown in the drawing). And, an audio signal, in which a level of an object outputted from the audio decoder 1741 is adjusted using the preset information, is outputted via the speaker unit included in the display unit 1770. Moreover, the data decoded by the decoder 1740 can be stored in the storage medium 1750 such as the HDD.

Meanwhile, the signal decoding apparatus 1700 can further include an application manager 1760 capable of controlling a plurality of data received by having information inputted from a user.

The application manager 1760 includes a user interface manager 1761 and a service manager 1762. The user interface manager 1761 controls an interface for receiving an input of information from a user. For instance, the user interface manager 1761 is able to control a font type of text visualized on the display unit 1770, a screen brightness, a menu configuration and the like. Meanwhile, if a broadcast signal is decoded and outputted by the decoder 1740 and the display unit 1770, the service manager 1762 is able to control a received broadcast signal using information inputted by a user. For instance, the service manager 1762 is able to provide a broadcast channel setting, an alarm function setting, an adult authentication function, etc. The data outputted from the application manager 1760 are usable by being transferred to the display unit 1770 as well as the decoder 1740.

Accordingly, the present invention provides the following effects or advantages.

First of all, one of a plurality of preset information is selected using a plurality of preset metadata without user's setting on each object, whereby a level of an output channel of an object can be adjusted with ease.

Secondly, it is able to efficiently reconstruct an audio signal by individually selecting to apply the preset information by a data region unit or selecting to apply the same preset information to all data regions of a downmix signal according to a characteristic of a sound source.

Thirdly, it is able to adjust a level or position of an output channel of an object by selecting more suitable preset information in a manner of checking an object adjusted by applying preset information and selected preset metadata via a display unit.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of processing an audio signal, comprising:

receiving a downmix signal including at least one object, object information based on an attribute of the object, preset information to render the downmix signal, and preset attribute information indicating an attribute of the preset information, wherein the attribute of the preset information indicates whether the preset information is dynamic or static and wherein the dynamic indicates that the preset information is present in an extension region of a data region and the static indicates that the preset information is present in an extension region of a configuration information region;

rendering the downmix signal by applying the preset information in the extension region of the configuration information region to a data region of the downmix signal to which the preset information in the extension region of the configuration information region is applied based on the preset attribute information; and rendering the downmix signal by applying the preset information in the extension region of the data region to one corresponding data region of the downmix signal based on the preset attribute information.

2. The method of claim 1, further comprising:

generating downmix processing information to control panning or gain of the downmix signal and multi-channel information to upmix the downmix signal by using the object information and the preset information; and modifying the downmix signal by using the downmix processing information.

3. An apparatus of processing an audio signal, comprising:

a signal receiving unit receiving a downmix signal including at least one object and object information based on an attribute of the object;

a preset attribute information receiving unit receiving a preset attribute information indicating an attribute of preset information to render the downmix signal, wherein the attribute of the preset information indicates whether the preset information is dynamic or static and wherein the dynamic indicates that the preset information is present in an extension region of a data region and the static indicates that the preset information is present in an extension region of a configuration information region; and a rendering unit rendering the downmix signal by applying the preset information in the extension region of the configuration information region to a data region to which the preset information in the extension region of the configuration information region is applied, and rendering the downmix signal by applying the preset information in the extension region of the data region to one corresponding data region of the downmix signal based on the preset attribute information.

4. The apparatus of claim 3, further comprising:

an information processing unit configured to generate downmix processing information to control panning or gain of the downmix signal and multi-channel information to upmix the downmix signal by using the objection information and the preset information; and a downmix signal processing unit configured to modify the downmix signal by using the downmix processing information.

* * * * *